Apr. 17, 1923.
C. L. CORYELL
1,452,416
VALVE
Filed April 26, 1921
2 Sheets-Sheet 2
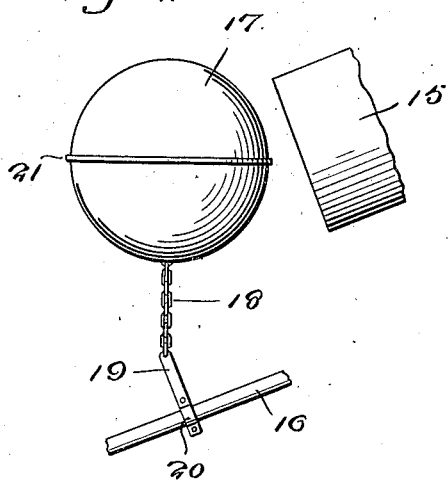
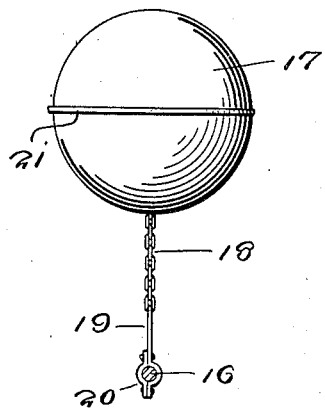
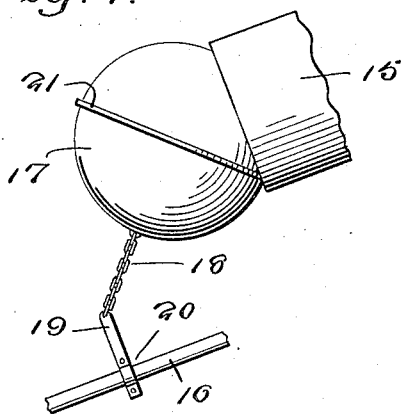
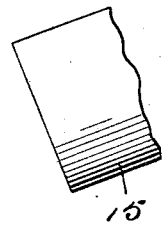
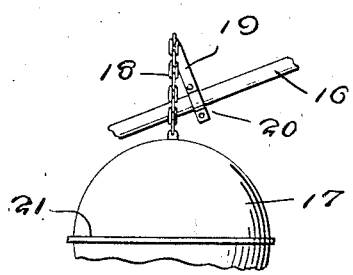
C. L. Coryell
INVENTOR
BY Victor J. Evans
ATTORNEY
WITNESS:

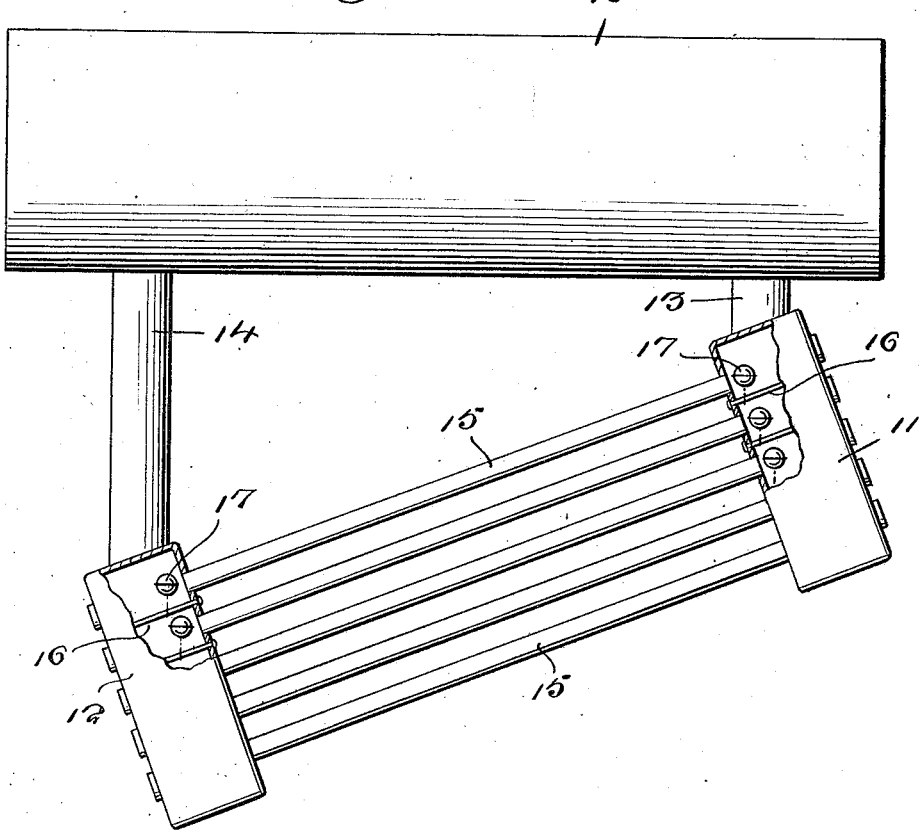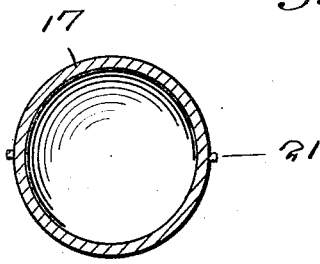

Patented Apr. 17, 1923.

1,452,416

UNITED STATES PATENT OFFICE.

CHARLES L. CORYELL, OF NEODESHA, KANSAS.

VALVE.

Application filed April 26, 1921. Serial No. 464,755.

*To all whom it may concern:*

Be it known that I, CHARLES L. CORYELL, a citizen of the United States, residing at Neodesha, in the county of Wilson and State of Kansas, have invented new and useful Improvements in Valves, of which the following is a specification.

This invention relates to oil tube stills and has particular application to a valve element therefor.

Stills of the above mentioned character operate under considerable pressure, and while a small leak in any of the tubes will not result in serious damage, it does result in the waste of the oil.

Frequently the tubes split, and again are often times separated from their headers, which materially affects the operation of the still. It is of course understood that the circulation of the oil through the tubes cannot be entirely shut off, as it would cause an explosion, for which reason stills of this character are not provided with valves to control the communication between the headers and the still proper.

It is therefore the purpose of this invention to provide a valve for each tube of the still, the valve being in the nature of a float which occupies a position adjacent one end of the tube, the valve being designed to permit of a free circulation of the oil through the tubes, as well as to close the tube cutting off communication between the latter and the adjacent header should the tube develop a leak, thus preventing oil from circulating through this particular tube.

More specifically stated, the valve is of spherical formation, and encircled by a flange which allows the tube to drain out when the still is being emptied, and at the same time assist in providing an effective closure for the tube under conditions above mentioned.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views, wherein:

Figure 1 is an enlarged view of a still partly in section.

Figure 2 is a fragmentary view on an enlarged scale showing the opened position of the valve.

Figure 3 is a view in elevation of the valve showing the stay rod in section.

Figure 4 is a detail view of one of the stay bolts showing a valve associated therewith.

Figure 5 is a view showing a fragmentary portion of one of the tubes, and the position of the valve and stay bolt with relation to said tubes.

Figure 6 is a sectional view through the valve.

Referring to the drawings in detail, 10 indicates the still proper beneath which is arranged the headers 11 and 12 respectively. These headers are supported from the still 10 by conduits 13 and 14 respectively, the former being comparatively short with regard to the latter, inasmuch as the tubes 15 which connect the headers are arranged at an angle or inclination to the still 10. Stills of this character operate under a considerably high pressure, the oil passing from the still 10 through the pipe into the header 12, the circulation of the oil being through the tubes 15 into the header 11 and thence back into the still 10. The headers 11 and 12 are also connected together and braced by stay rods 16, one of which is arranged beneath each tube in parallel relation thereto as illustrated in Figure 2.

To overcome the objections and difficulties resultant from a leaking tube, I provide a float valve for each tube 15, one of these valves being indicated at 17 and illustrated as a ball. Each valve is connected to one end of a chain or other suitable flexible element 18, the chain in turn being connected to an extension 19 designed to be clamped about the adjacent stay rod as at 20. The extension 19 is utilized to position the valve 18 a distance above the stay rod to keep the valve and its chain from becoming tangled or wrapped about any of the stay bolts, and also keeps the valve from hanging down in front of the tube when the still is emptied. The valve 17 is provided with a flange 21 which encircles the valve, the flange being very narrow, and is employed for the purpose of allowing the tubes to drain when the still is being emptied. The ball normally is adjusted to hang a short distance from the tube to allow for a free circulation of the oil, the circulation being promoted by the hot oil passing upwardly through the tubes 15. Should a leak develop in any one of the tubes 15, the valve 17 for the particular tube would be forced under pressure to close the adjacent end of the tube, thereby cutting off the circulation of oil through said tube, and when under pressure the flange 21 will yield slightly to assist in effectively closing the adjacent end of said tube for the purpose specified.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. The combination with a still of the character described including spaced headers, tubes communicating with said headers, stay bolts connecting said headers and arranged beneath said tubes, of a float valve connected with each stay bolt and normally disposed adjacent one end of the particular tube arranged above the stay bolt, said valve being designed to close said tube, and a narrow flange encircling said valve for the purpose specified.

2. The combination with a still of the character described including spaced headers, tubes communicating with said headers, stay bolts connecting the headers and arranged beneath said tubes, an extension projecting from each stay bolt and arranged within one of said headers, a flexible element connected with said extension, a float valve supported by said flexible element and normally disposed adjacent one end of one of the tubes to allow for free circulation through the tube, a narrow flange encircling said valve, and said valve being designed to close said tube for the purpose specified.

CHARLES L. CORYELL.